US008610306B2

(12) United States Patent
Kirchner (10) Patent No.: US 8,610,306 B2
(45) Date of Patent: Dec. 17, 2013

(54) POWER PLANT CONTROL SYSTEM AND METHOD FOR INFLUENCING HIGH VOLTAGE CHARACTERISTICS

(75) Inventor: Andreas Kirchner, Osnabrück (DE)

(73) Assignee: General Electric Company, Schenectady, NY (US)

( * ) Notice: Subject to any disclaimer, the term of this patent is extended or adjusted under 35 U.S.C. 154(b) by 30 days.

(21) Appl. No.: 13/194,647

(22) Filed: Jul. 29, 2011

(65) Prior Publication Data
US 2012/0061964 A1    Mar. 15, 2012

(51) Int. Cl.
*H02J 1/10*    (2006.01)
(52) U.S. Cl.
USPC .................................. 307/43; 290/44; 290/55
(58) Field of Classification Search
USPC .................................. 307/43, 151; 290/44, 55
See application file for complete search history.

(56) References Cited

U.S. PATENT DOCUMENTS

| | | |
|---|---|---|
| 3,632,908 A | 1/1972 | Bleibtreu et al. |
| 4,694,241 A | 9/1987 | Genuit |
| 7,145,760 B2 | 12/2006 | Stenestam et al. |
| 2006/0250683 A1* | 11/2006 | Balan .......................... 359/341.1 |
| 2007/0055889 A1* | 3/2007 | Henneberry et al. .......... 713/186 |
| 2007/0228838 A1* | 10/2007 | Delmerico et al. .............. 307/84 |
| 2008/0088131 A1* | 4/2008 | Thisted ............................. 290/44 |
| 2009/0160187 A1* | 6/2009 | Scholte-Wassink ............ 290/44 |
| 2009/0218817 A1* | 9/2009 | Cardinal et al. ................. 290/44 |
| 2010/0094474 A1* | 4/2010 | Larsen et al. .................. 700/287 |
| 2010/0102792 A1* | 4/2010 | Dishman et al. ............... 323/301 |
| 2010/0188240 A1* | 7/2010 | Wells ............................. 340/660 |
| 2011/0148431 A1* | 6/2011 | Satou et al. .................... 324/547 |

* cited by examiner

*Primary Examiner* — Jared Fureman
*Assistant Examiner* — Alfonso Perez Borroto
(74) *Attorney, Agent, or Firm* — Global Patent Operation; Douglas D. Zhang (57) ABSTRACT

A control system for a power plant is provided, configured to influence actual HV characteristics of an HV power line at a point-of-interconnection to a grid. The control system includes an MV-compliant measurement system configured for connection with an MV power line of the power plant, and an evaluation unit. The evaluation unit is connected to the MV-compliant measurement system and is configured to determine calculated HV characteristics of the HV power line based on measurement values received from the MV-compliant measurement system at the MV power line and based on a model of a transformer. The transformer transforms from medium voltage on the MV power line to high voltage on the HV power line. The evaluation unit is configured to generate a control signal based on the calculated HV characteristics in order to control the power plant for influencing the actual HV characteristics of the HV power line.

20 Claims, 9 Drawing Sheets

POWER PLANT CONTROL SYSTEM AND METHOD FOR INFLUENCING HIGH VOLTAGE CHARACTERISTICS

BACKGROUND OF THE INVENTION

The subject matter described herein relates generally to methods and systems for controlling power plants to influence the characteristics of high voltage (HV) power lines at points-of-interconnection to a grid, and more particularly, to methods and systems for controlling renewable-power plants such as wind energy power plants.

A power plant has to meet the characteristics, i.e., the operating parameters, defined by the grid code to ensure proper functioning of the electrical grid. Power producers like photovoltaic power stations or wind farms have to comply with the grid code. In particular, compliance with the grid code requires that the electrical characteristics meet those prescribed by the grid code at the point-of-interconnection (POI) to the grid. The POI is typically at the high-voltage (HV) side. The HV side is separated from the medium voltage (MV) side by a transformer which transforms medium voltage at the MV side to high voltage at the HV side.

For conformance with the grid code voltage and current may be measured on an HV power line, and the measurement values may be used to control the power plant in order to influence or regulate the electrical characteristics of the HV power line at the HV side before the POI. However, special voltage and current transformers are needed for these measurements which are technically demanding since they have to cope with the high voltages at the HV side and are therefore expensive.

Therefore, there is a need for a less expensive method and system to influence the HV characteristics at the POI for compliance with the grid code.

BRIEF DESCRIPTION OF THE INVENTION

In one aspect, a control system for a power plant is provided, wherein the power plant includes a medium voltage (MV) power line. The control system is configured to influence actual high voltage (HV) characteristics of an HV power line at a point-of-interconnection to a grid. The control system includes an MV-compliant measurement system configured for connection with the MV power line of the power plant. The MV-compliant measurement system includes at least one of a voltage measurement device configured for measuring the voltage on the MV power line and a current measurement device configured for measuring the current on the MV power line. The control system further includes an evaluation unit. The evaluation unit is connected to the MV-compliant measurement system and is configured to determine calculated HV characteristics of the HV power line based on measurement values received from the MV-compliant measurement system at the MV power line and based on a model of a transformer. The transformer transforms from medium voltage on the MV power line to high voltage on the HV power line. The evaluation unit is configured to generate a control signal based on the calculated HV characteristics in order to control the power plant for influencing the actual HV characteristics of the HV power line.

In another aspect, a power plant is provided. The power plant includes an MV power line and a control system. The control system is configured to influence actual HV characteristics of an HV power line at a point-of-interconnection to a grid. The control system includes an MV-compliant measurement system connected to the MV power line of the power plant. The MV-compliant measurement system includes at least one of a voltage measurement device configured for measuring the voltage on the MV power line and a current measurement device configured for measuring the current on the MV power line. The control system further includes an evaluation unit connected to the MV-compliant measurement system and configured to determine calculated HV characteristics of the HV power line based on measurement values received from the MV-compliant measurement system at the MV power line and based on a model of a transformer. The transformer transforms from medium voltage on the MV power line to high voltage on the HV power line. The evaluation unit is configured to generate a control signal based on the calculated HV characteristics in order to control the power plant for influencing the actual HV characteristics of the HV power line.

In yet another aspect, a method of influencing the actual HV characteristics of an HV power line is provided. The HV power line is connected to an MV power line of a power plant via a transformer for transforming from medium voltage on the MV power line to high voltage on the HV power line. The method includes measuring at least one of voltage and current on the MV power line, calculating HV characteristics of the HW power line based on the measured values and based on a model of the transformer, generating a control signal based on the calculated HV characteristics, and controlling the power plant by the control signal for influencing the actual HV characteristics of the HV power line.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include measuring electrical characteristics at the medium voltage (MV) side of a transformer that transforms from medium voltage at the MV side to high voltage (HV) on a high voltage side, and further determining calculated electrical characteristics at the HV side based on the measured electrical characteristics on the MV side and based on a model of the transformer. Typically, the transformation ratio or turns ratio of the transformer is determined. This may include determining the tap position of a tap changer, and this determined transformation ratio is taken into account in the model of the transformer when determining the HV side characteristics.

The term "based on", as used herein, is intended to be open in the sense that determination of characteristics based on a first quantity may optionally include a determination of the characteristics based on any number of further quantities. For example, "generating a control signal based on calculated HV characteristics" also includes "generating the control signal based on the calculated HV characteristics and on measured HV characteristics". In contrast, the term "solely based on" is intended to be closed in the sense that the determination of characteristics solely based on a first quantity does not include the determination based on further quantities. For example, "generating a control signal solely based on calculated HV characteristics" does not allow a dependence of the control signal on further quantities such as actual, or measured HV characteristics.

The term "to influence" as used herein includes the notion of "to regulate" or "to control", but also the notions of indirectly regulating or indirectly controlling. An indirect regulation or control need not necessarily make measurements of the quantities or characteristics that are regulated/controlled for feedback, but may feed back corresponding derived quantities/characteristics instead, for instance, calculated quantities/characteristics. For instance, "influencing high voltage characteristics of a high voltage power line" can be effected by an indirect regulation based on calculated high voltage characteristics (as opposed to actual, measured high voltage characteristics).

The term "high voltage" as used herein refers to voltages in the range from 50 to 800 kV and all subranges therebetween, more specifically from 50 to 750 kV, such as from 50 to 250 kV or from 220 to 440 kV. The term "medium voltage" as used herein refers to voltages in the range from a few kilovolts to 50 kV and all subranges therebetween, more specifically from 6 to 50 kV, such as 30 or 33 kV. Voltages below these ranges shall be called "low voltage".

Figure 2:
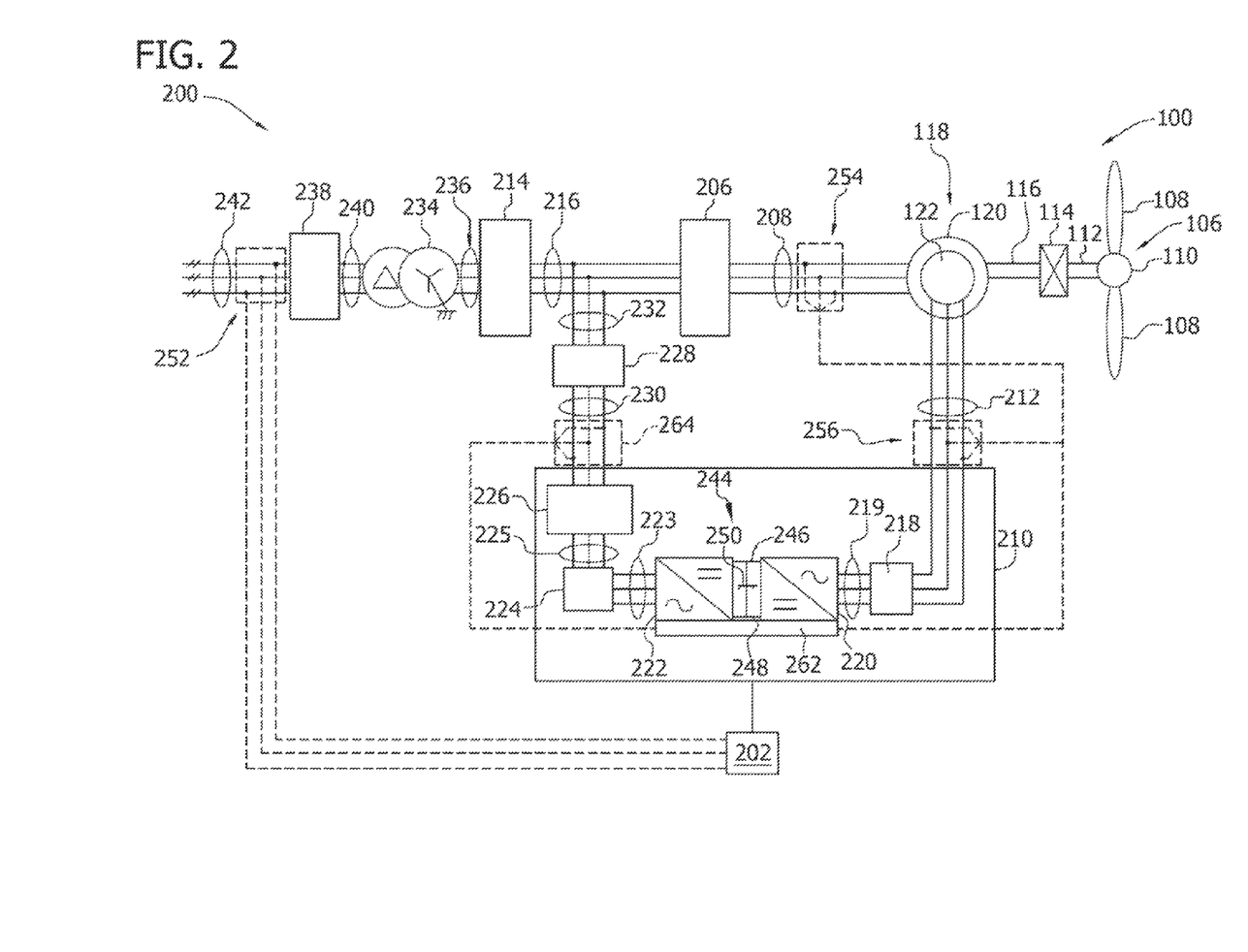
FIG. 2 is a schematic view of an exemplary electrical and control system suitable for use with the wind turbine shown in FIG. 1.
Figure 3:
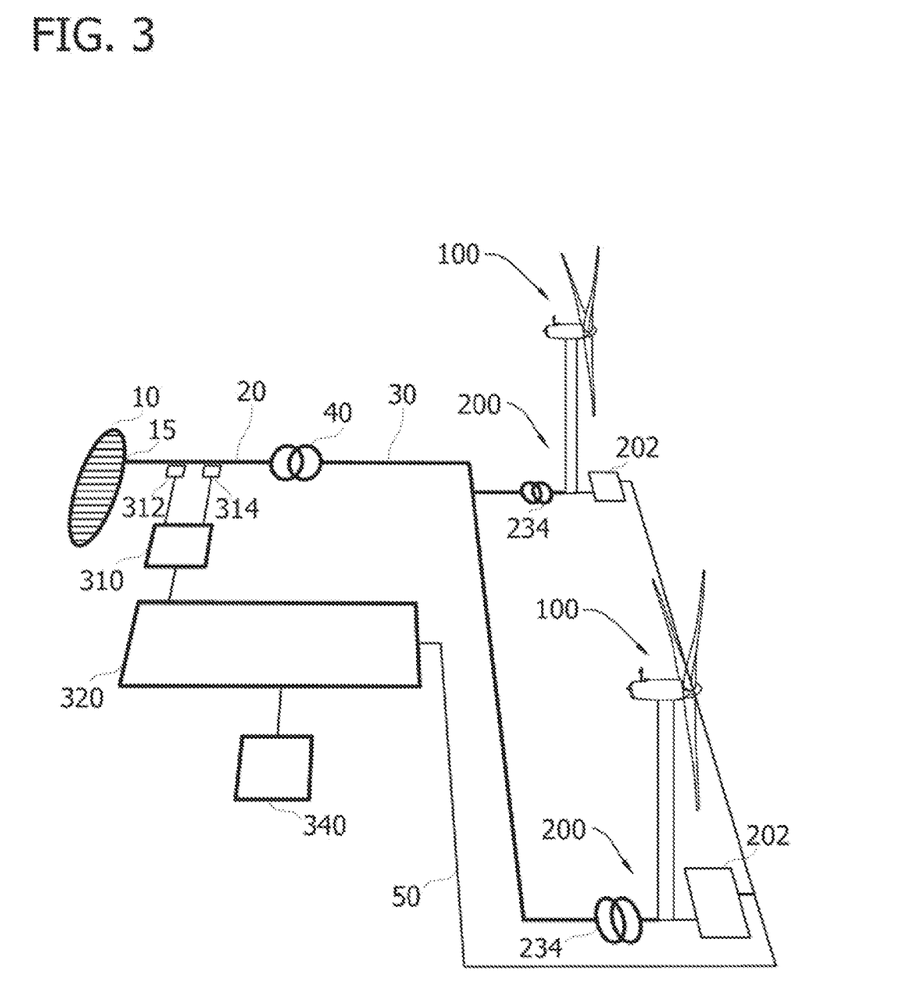
FIG. 3 is a schematic illustration of a plant control system based on an HV-compliant measurement system for determining characteristics of an HV power line.

FIG. 3 shows a control system for a wind power plant. The wind power plant includes wind turbines 100. Wind turbines 100 are described further below with respect to FIG. 1. The wind power plant further includes a control systems 200 with wind turbine control systems 202 and a transformer 234. Control system 200 is described further below with respect to FIG. 2.

The wind power plant shown in FIG. 3 includes a medium voltage power line 30, a high voltage power line 20, and a transformer 40 configured to transform the medium voltage on the medium voltage power line 30 to high voltage on the high voltage power line 20. The electrical characteristics of the high voltage power line 20, including all of or any subset of voltage, current, power, volt-ampere-reactive, and power factor, shall match the grid code of grid 10 at the point-of-interconnection 15.

A plant control system is provided including a high voltage-compliant measurement system 310. A high voltage-compliant measurement system is a system whose measurement device or measurement devices are adapted for measurement in the high voltage environment. For example, a medium or low voltage measuring device is typically not high voltage-compliant. The high voltage-compliant measurement system 310 includes measurement devices 312 and 314 for measuring the voltage and current on the high voltage power line 20, respectively. An evaluation unit 320 with a human-machine interface (HMI) 340 receives the measured voltage and current of the high voltage power line 20. The evaluation unit 320 may compute other electrical characteristics from the measured voltage and current. The evaluation unit feeds back a control signal that is based on the measured quantities (voltage, current of the high voltage power line) or on electrical characteristics derived therefrom. The control signal is input via control line 50 to the wind turbine control systems 202, so as to regulate the output of the wind turbines 100 to the medium voltage power line 30. A control loop is established in this way for regulating the characteristics of the HV power line at the point-of-interconnection 15 to the grid 10 to comply with the grid code thereof.

The measurement devices for measuring voltage and current of the high voltage power line are typically special voltage and current transformers. These components are usually very expensive.

Figure 4:
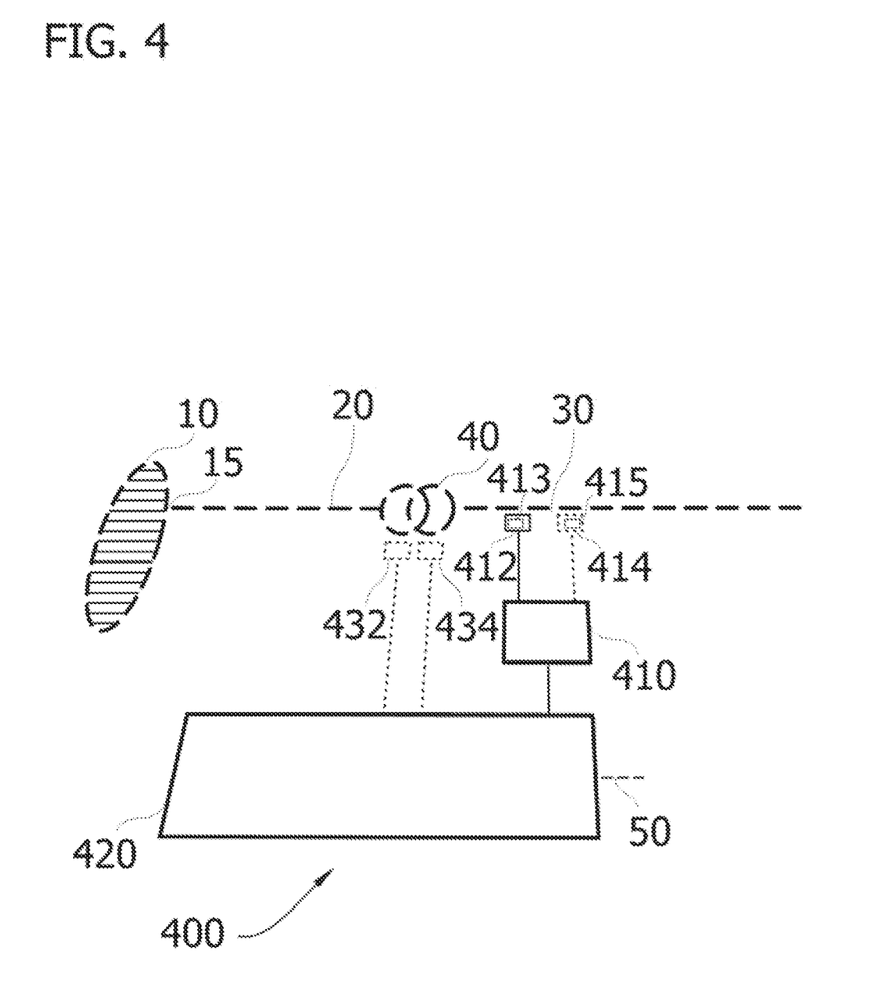
FIG. 4 is a schematic illustration of plant control system according to embodiments described herein.

FIG. 4 shows a control system 400 according to embodiments described herein. The control system includes a medium voltage-compliant measurement system 410. A medium voltage-compliant measurement system is a system whose measurement device or measurement devices are adapted for measurement in the medium voltage environment. For example, a low voltage measuring device is typically not medium voltage-compliant. The MV-compliant measurement system 410 includes measurement device 412 configured for measuring an electrical quantity on a medium voltage power line 30. The measurement device 412 can be a voltage measurement device for measuring the voltage on the MV power line 30 or can be a current measurement device for measuring the current on the MV power line 30. Without limitation thereto, the measurement device 412 will be regarded as a voltage measurement device in the following. The medium voltage power line 30, and a transformer 40, a high voltage power line 20 and a grid 10 with a point-of-interconnection 15 are shown with dashed lines in FIG. 4 since they are not regarded as part of the control system in FIG. 4.

The MV-compliant measurement system 410 may include a further measurement device 414 for measuring an electrical quantity of the MV power line 30, and may include any number of additional measurement devices. Without limitation thereto, the further measurement device 414 will be regarded as a current measurement device in the following. The current measurement device 414 is shown with a dotted line as an optional feature in FIG. 4. The voltage measurement device 412 may include a medium voltage-compliant voltage transformer 413 and the current measurement device 414 may include a medium voltage-compliant, current transformer 415. By increasing the number of measurement devices for measuring different electrical, quantities, more information about the electrical characteristics of the MV power line can be determined and used or processed for control purposes.

The medium voltage line 30 line may be a three-phase power line. The transformer 40 may be adapted to transform three-phase voltages. A three-phase power line includes three leads, one for each phase. In this case, according to some embodiments, the MV-compliant measurement system 410 may include at least two, typically three, voltage measurement devices and/or at least two, typically three, current measurement devices. If there are two voltage measurement devices they are connected to two different leads, and where there are three voltage measurement devices they are connected to three different leads of the MV power line. If there are two current measurement devices they are connected to two different leads, and where there are three current measurement devices they are connected to three different leads of the MV power line. When there are three voltage measurement devices, failure of one of them can be compensated since the measurement value of the third one can be computed if the loads are known. Similarly, when there are three current measurement devices, failure of one of them can be compensated since the measurement value of the third one can be computed if the loads are known. In this way, the system is less prone to failure.

The control system 400 further includes an evaluation unit 420. The evaluation unit 420 is connected to the MV-compliant measurement system 410. The evaluation unit 420 can receive measurement values from the MV-compliant measurement system 410, such as a measured voltage from voltage measurement device 412 and/or a measured current from current measurement device 414. The evaluation unit may receive three voltage measurement signals, one for each phase of a three-phase MV power line, and may receive three current measurement signals and corresponding values, one for each phase of a three-phase MV power line. The evaluation unit 420 has access to a model of the transformer 40. Such a model can, be implemented as a software program modeling the physical properties of the transformer. The model may be stored in a memory of the evaluation unit or may be stored elsewhere, in which case the evaluation unit would have remote access thereto. The evaluation unit can be a workstation or computer connected to a network.

The evaluation unit 420 is configured to calculate high voltage characteristics of the high voltage power line 20. The calculation is based on the measurement values received from the MV-compliant measurement system 410, such as voltage and/or current values. The electrical characteristics determined by the evaluation unit from the measurements on the MV side will be called "calculated HV characteristics" to distinguish them from electrical characteristics of the HV power line that are derived from measurements on the HV power line 20 ("measured" or "actual" HV characteristics). The calculated HV characteristics may include all or any out of voltage (V), current (I), power (P), reactive power (Q) in volt-ampere-reactive (Var), and power factor (Pf), or combinations thereof or derived quantities therefrom. The HV characteristics may include three calculated HV voltages, HV currents etc. when the HV line is a three-phase power line.

The calculation is further based on the model of the transformer. The model of the transformer may take any one of the following physical properties of the transformer into account: the turns ratio of the transformer, the temperature of the transformer, the transformer type, resistance of the transformer or of its parts, reactance of the transformer or of its parts, namely reactance of inductive or capacitive parts, magnetization or combinations or derivations thereof. The turns ratio is typically determined by the tap position of a tap changer of the transformer. An example of a transformer model will be described hereinbelow with respect to FIG. 7.

The values of these model quantities may be fixed if the transformer operates in only one state or may be entered by an operator, who may use a human-machine interface to the evaluation unit for this purpose. In other embodiments, at least the turns ratio may be determined by a measurement device. This measurement device may be a sensor determining the momentary tap position of a tap changer of the transformer. FIG. 4 shows, in dotted lines as optional features, a turns ratio measurement device 432 and a temperature measurement device 434 for determining the turns ratio and temperature of the transformer 40, respectively. These devices are connected to the evaluation unit 420, which can receive the corresponding measurement values to use them to update the model of the transformer.

Using the measurement values from the MV side and the model of the transformer, the evaluation unit can simulate the characteristics at the HV side without the actual need to determine the HV characteristics on the HV power line through measurement. In this way, the very expensive measurement equipment for measuring in the HV environment is not needed.

The evaluation unit 420 is further configured to generate a control signal based on the calculated high voltage characteristics. The evaluation unit may include an output portion for connecting to a control line 50, shown in dashed lines in FIG. 4 because it is not regarded as part of the control system in FIG. 4. The control signal may be generated to control a power plant to influence the actual HV characteristics of the HV power line. In particular, by this indirect regulation, conformance with the grid code of grid 10 may be established at the HV side.

Figure 5A:
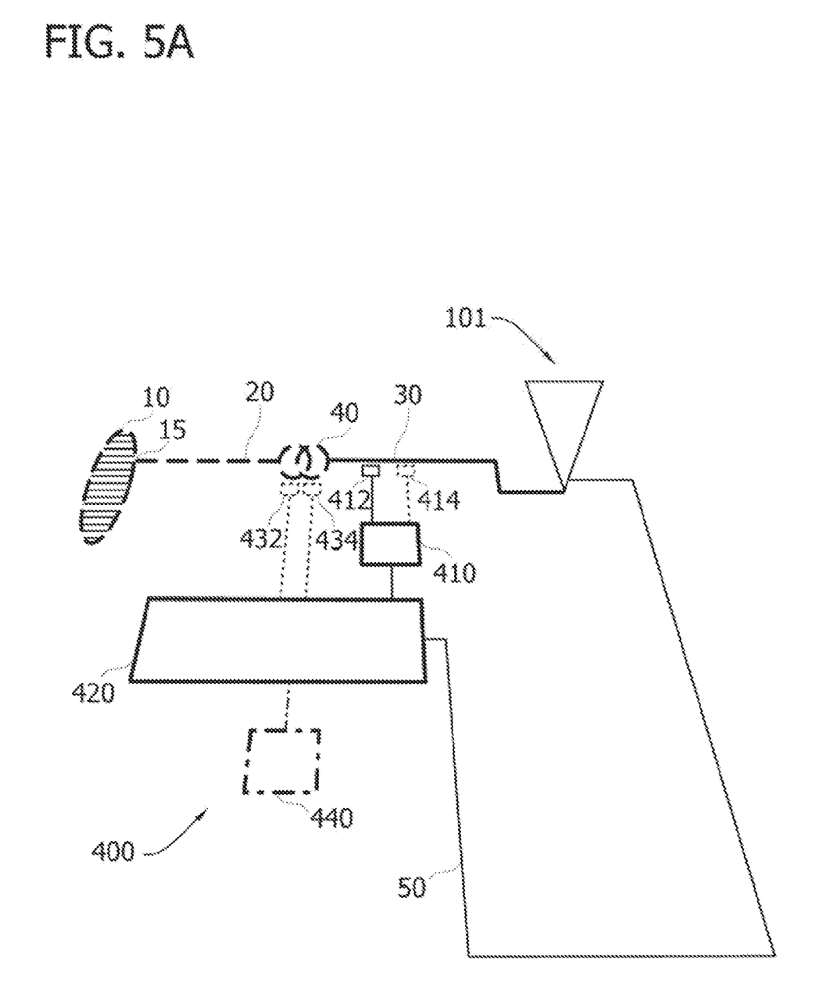
FIG. 5 is a schematic illustration of a power plant including a power generating unit and a plant control system according to embodiments described herein.

FIG. 5A shows a power plant including a control system 400 according to embodiments described herein. A human-machine interface 440 is shown in dashed-dotted lines as an optional feature for input to the evaluation unit by an operator. The power plant further includes an energy generating unit 101. The energy generating unit may be one or several turbines, such as wind turbines or one or more photovoltaic modules or the like. The plant may be a renewable-power plant, such as to wind energy power plant or photovoltaic power station. The power plant shown in FIG. 5A also includes MV power line 30.

Figure 5B:
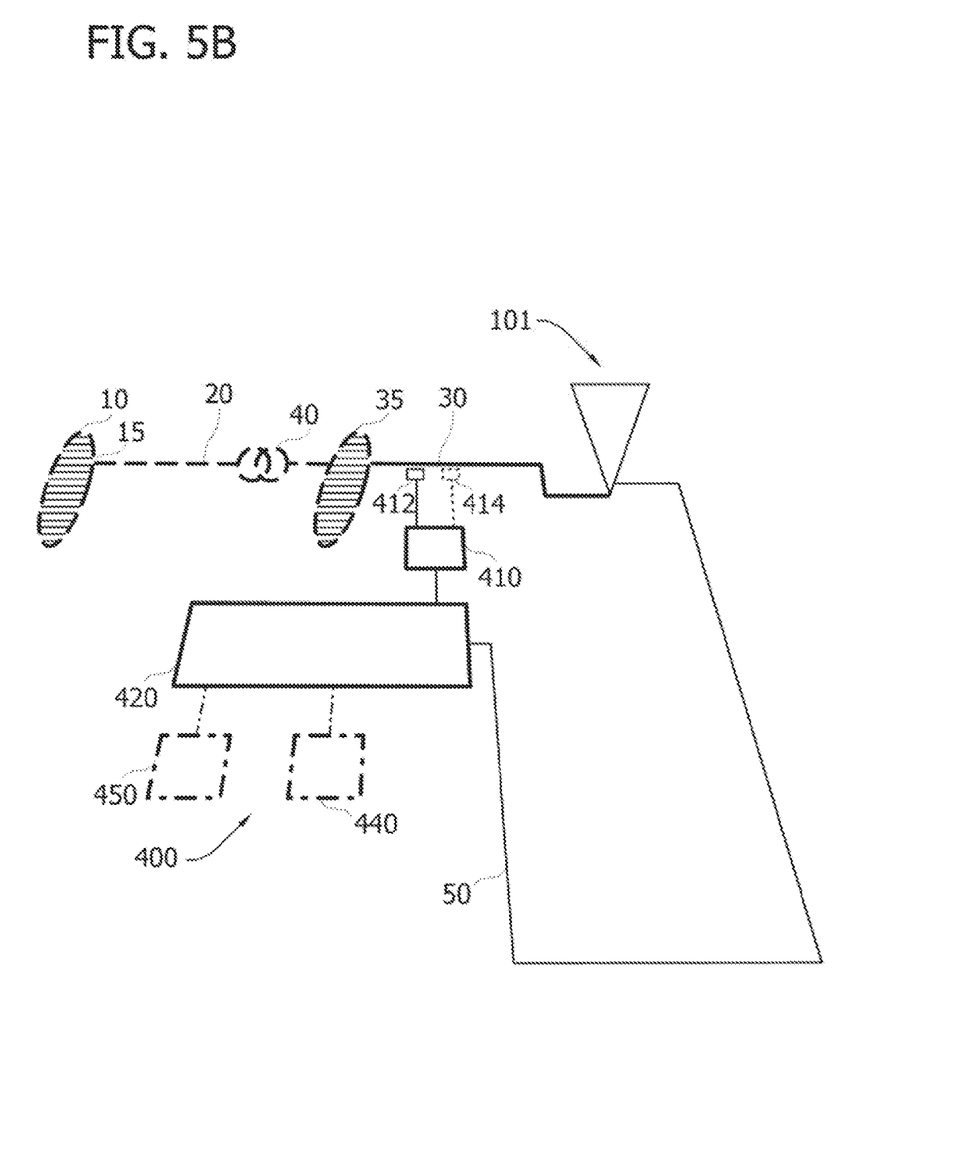

The power plant may include the transformer 40 for transforming from medium voltage to high voltage, and may include the high voltage power line 20. In this case, the power plant feeds energy into the grid 10 at the point-of-interconnection 15. In alternative embodiments, the power plant connects only to a medium voltage grid 35 as is shown in FIG. 5B, for example. The transformer and the high voltage side may then be under the control of a third party. The third party may then provide information on the momentary state of the transformer, for instance, the turns ratio and/or temperature, to the power plant and, more particularly, to the evaluation unit 420 such that the power plant can be controlled as described hereinbefore. In FIG. 5B, reference sign 450 symbolically represents an input network connected to the evaluation unit 420 for receiving, such information from a third party. In the first situation, where the plant controls the transformer 40 and the HV side, input network 450 is typically absent. In the second situation measurement devices 432 and 434 may be absent, but input network 450 may be present to provide similar information to the evaluation unit 420.

The power plant may include a control line 50. The control signal generated by the evaluation unit 420 may be passed through the control line to the energy generating unit 101 to control the power output and electrical characteristics thereof. In this way, an indirect regulation loop for setting the HV characteristics at the HV side is established.

Control systems according to embodiments described herein may, additionally to the MV-compliant measurement system, include an HV-compliant measurement system for directly measuring electrical characteristics on the HV side. This is advantageous where fail-safeness is to be improved. The additional measured HV characteristics can be compared with the HV characteristics that are calculated as described hereinabove. In case of too large deviations of the corresponding values, an alarm may be generated and/or the control of the power plant be based solely on either the measured HV characteristics or the calculated HV characteristics, depending on which are considered more reliable in the given situation.

Figure 6:
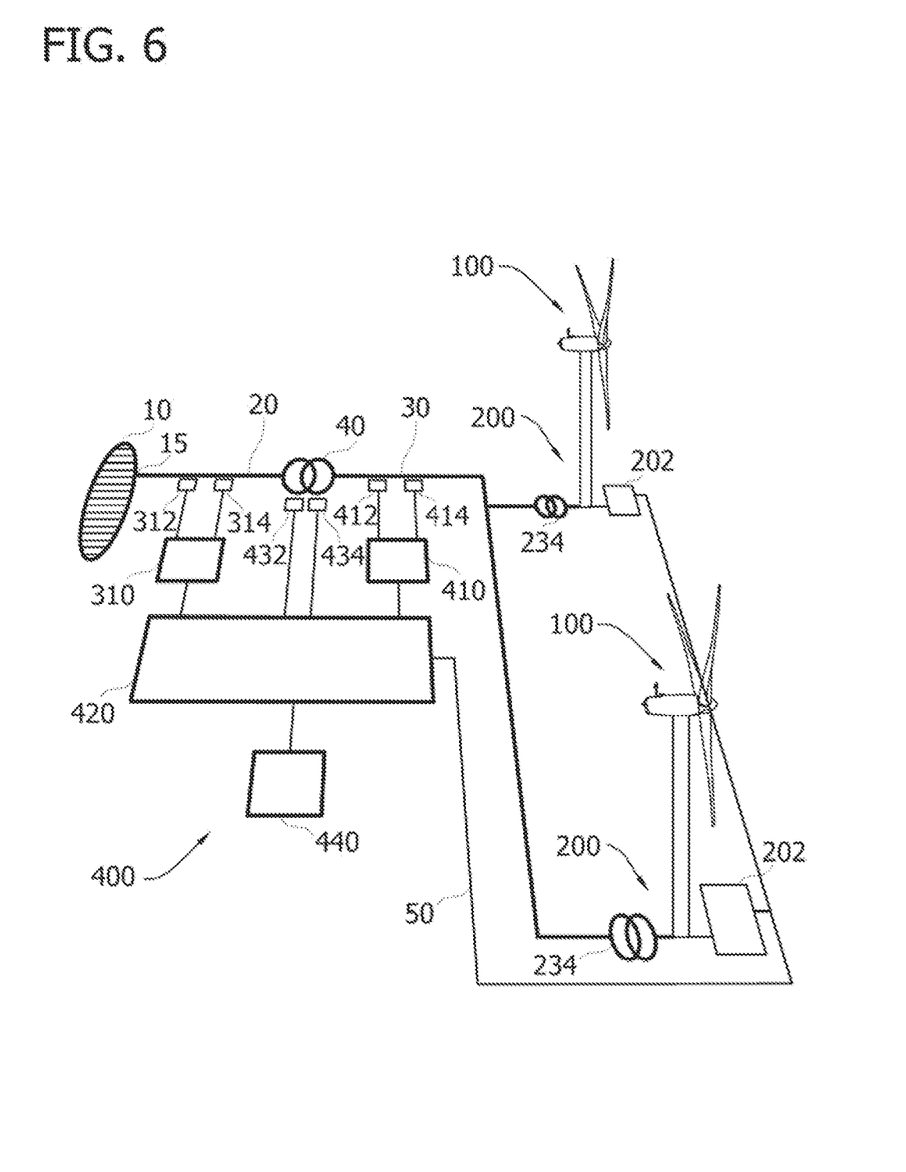
FIG. 6 is a schematic illustration of wind energy power plant including wind turbines and a plant control system according to embodiments described herein.

FIG. 6 illustrates an embodiment of a wind power plant including wind turbines 100 as energy generating units and control systems 200 with wind turbine control systems 202 and transformers 234. Exemplary embodiments of these components will be described in more detail later. The wind power plant includes MV power line 30, transformer 40, HV power line 20 and control line 50.

FIG. 6 shows an embodiment of a control system 400 that includes, in addition to components known from the description of FIGS. 4 and 5, an HV-compliant measurement system 310. The HV-compliant measurement system could be a system similar to the one described with respect to FIG. 3. The HV-compliant system 310 includes at least one measurement device for measuring a corresponding at least one electrical quantity of the HV power line 20, for instance, voltage or current. In FIG. 6, two HV-compliant measurement devices are shown, namely a voltage measurement device 312 and a current measurement device 314 for measuring the actual voltage and actual current on the HV power tine 20, respectively.

The high voltage power 20 line may be three-phase power lines. The transformer 40 may be adapted to transform three-phase voltages. A three-phase power line includes three leads, one for each phase. In this case, according to some embodiments, the HV-compliant measurement system 310 may include at least two, typically three, voltage measurement devices and/or at least two, typically three, current measurement devices. If there are two voltage measurement devices they are connected to two different leads, and where there are three voltage measurement devices they are connected to three different leads of the HV power line. If there are two current measurement devices they are connected to two different leads, and where there are three current measurement devices they are connected to three different leads of the HV power line. When there are three voltage measurement devices, failure of one of them can be compensated since the measurement value of the third one can be computed. Similarly, when there are three current measurement devices, failure of one of them can be compensated since the measurement value of the third one can be computed. In this way, the system is less prone to failure.

The HV-compliant measurement system is connected to the evaluation unit 420. The evaluation unit 420 may be configured to generate the control signal for the power plant based on the at least one measured electrical quantity, for instance, the measured voltage and/or measured current on the HV power line, in addition to the measured values from the MV-compliant measurement system. More generally, the control signal may be based on measured HV characteristics, which include quantities derived from the measured quantities on the HV side, for instance, power, volt-ampere-reactive, power factor or the like.

The evaluation unit 420 may be configured to compare calculated HV characteristics, i.e., those derived from measurements on the MV side, with measured HV characteristics, i.e., those derived from measurements on the HV side. A threshold value may be set for the tolerable deviation of each pair of electric quantities, for instance, calculated voltage/measured voltage, calculated current/measured current, etc. If one or more of the calculated and measured HV characteristics deviate by more than the respective threshold value, an alarm signal may be generated by the evaluation unit. The alarm signal may, for instance, be passed to the human-machine interface 440 for displaying the alarm to an operator.

The evaluation unit 420 may be configured to switch between control of the power plant based on the measured HV characteristics, the calculated HV characteristics or both the measured and calculated HV characteristics. For instance, if the HV-compliant measurement system 310 fails, the evaluation unit may switch to generating a control signal based on the calculated HV characteristics. Conversely, if the MV-compliant measurement system 310 fails, the evaluation unit may switch to generating a control signal based on the measured HV characteristics.

More generally, the evaluation unit may be configured to determine the reliability of the MV-compliant and/or HV-compliant measurement systems, or of any or all of their measurement devices, and/or of the measurement devices for measuring properties of the transformer. If the evaluation unit determines that some of the measurement devices do not appear to work properly, the calculated or measured HV characteristics, whichever the faulty measurement device influences, are not trusted and the evaluation unit switches to control based on the respective other, trusted HV characteristics. For example, if the voltage measurement device 312 on the HV side appears to be faulty and a deviation of the measured and calculated voltage of the HV power line above the threshold is detected, the evaluation unit 420 will switch to control based on MV-side measurements and transformer model calculations. Conversely, if the turns ratio measurement device 432 or the voltage measurement device 412 on the MV side appear to be faulty and a calculated HV characteristic derived therefrom deviates by more than a threshold value from the corresponding measured HV characteristic, the evaluation unit 420 will switch to control based on HV-side measurements.

Figure 7:
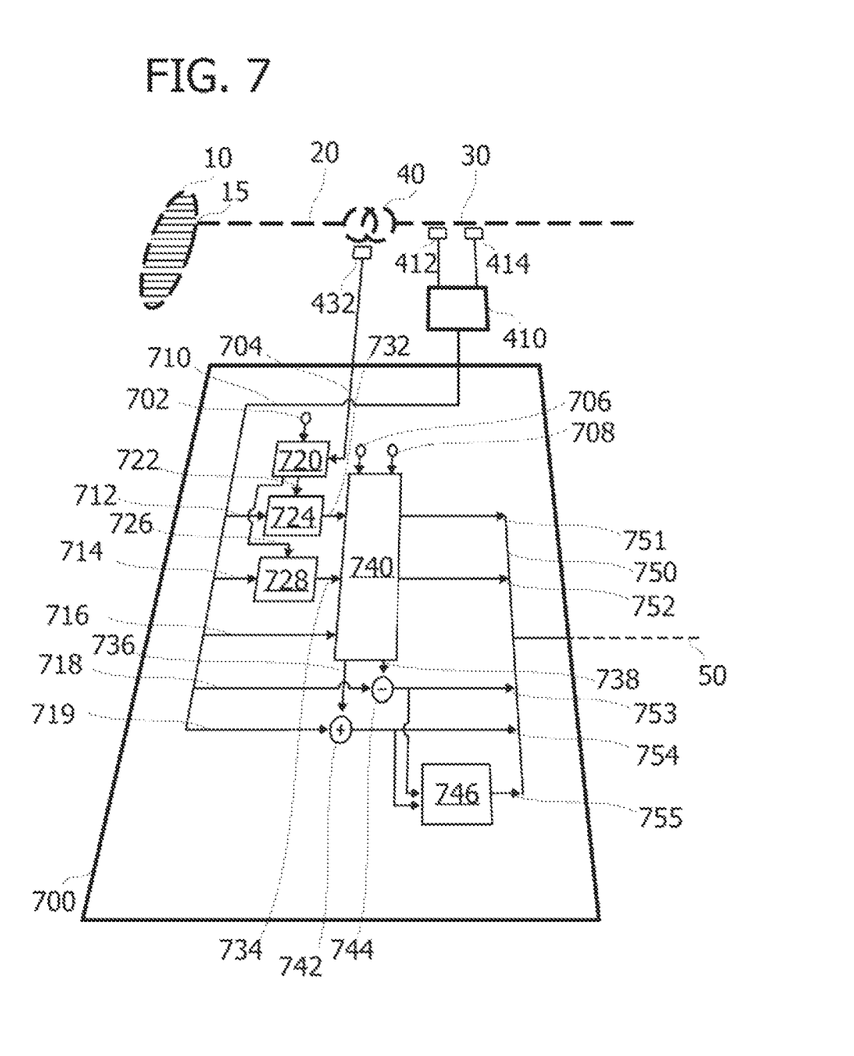
FIG. 7 provides an example of a transformer model that may be used in embodiments described herein.

An example for a transformer model will now be described with respect to FIG. 7. This transformer model is rather simple, and does, for instance, not take idle power losses or the temperature of the transformer into account. The example is merely provided for explanation and shall not be construed as a limitation to this transformer model or models building on it and being compatible with it.

The evaluation unit 700 is an example of an evaluation unit described herein. The evaluation unit 700 has input lines 702 and 704. Input 702 provides the ratio of the nominal voltage $U_{Ref\,HV}$ of the transformer high voltage side and nominal voltage $U_{Ref\,MV}$ of the transformer medium voltage side to a computation unit 720. Input line 704 provides information about the tap position of a tap changer of the transformer 40, measured by the measurement unit 432, to the computation unit 720. The measurement values may be digital or analog. Without limiting the disclosure, digital measurement values are assumed in the following. The computation unit 720 is adapted to determine a percentage value x from the tap position input, for instance, by assigning a x=92% to a tap position "1", x=94% to a tap position "2", x=96% to a tap position "3", x=98% to a tap position "4", x=100% to a tap position "5", x=102% to a tap position "6", x=104% to a tap position "7", x=106% to a tap position "8". The computation unit 720 is adapted to calculate an overall ratio n by the equation $$n=(U_{RefHV}/U_{RefMV})*(x/100\%).$$

The computation unit 720 outputs n at output line 722.

The evaluation unit 700 further includes computation units 724 and 728. The value n is input into these computation units from output line 722 or line 726, respectively. The (three-phase) voltage $U_{MV}$, designated by 712, and the (three-phase) current $I_{MV}$, designated by 714, are measurement values delivered by line 710 from measurement system 410 are input to the computation unit 724 and 728, respectively. The computation unit 724 computes an "interim" (three-phase) high voltage $U_{HV}'=U_{MV}*n$, and the computation unit 726 computes an "interim" (three-phase) high current $I_{HV}'=I_{MV}/n$. The interim high voltage and interim high current are provided as inputs to a transformer model computation unit 740 via output lines 732 and 734, respectively.

The transformer model computation unit 740 is further adapted to receive an input value 706 of the resistance $R_{Tr-HV}$ of the transformer and an input value 708 of the reactance $X_{Tr-HV}$ of the transformer, primarily of its inductance. The transformer model computation unit 740 may further receive or compute the measured medium voltage power angle values $PHI_{MV}$, as indicated by line 716. A negative value of $PHI_{MV}$ indicates inductive, a positive value capacitive behavior. The transformer model computation unit 740 is adapted to compute the voltage $U_{HV}$ of the high voltage side of the transformer and the current $I_{HV}$ of the high voltage side, and the power $P_{Tr}$ and the reactive power $Q_{Tr}$ of with the help of a transformer model using the following equations:

$$U_{HV}=((U_{Tr\_R}+U_{HV}')^2+U_{Tr\_I}^2)^{1/2} \quad (i)$$

$$P_{Tr}=3*I_{HV}'^2*R_{Tr\_HV}, \text{and} \quad (ii)$$

$$Q_{Tr}=-3*I_{HV}'^2*X_{Tr-HV} \quad (iii)$$

wherein $U_{Tr\_R}=X_{Tr-HV}*I_{Tr\_R}, U_{Tr\_I}=X_{Tr-HV}*I_{Tr\_R}-R_{Tr-HV}*I_{Tr\_I}, I_{Tr\_R}=I_{HV}'*\cos(PHI_{MV})$, and $I_{Tr\_I}=-AbS(I_{HV}')*\sin(PHI_{MV})$.

The calculated voltage $U_{HV}$ and the calculated current $I_{HV}$ are output to output portion 750 of the evaluation unit 700 via lines 751 and 752, respectively. The computed power $P_{Tr}$ is output via line 738 to a subtraction unit 744 that receives, as further input by line 718, the measured power $P_{MV}$ of the medium voltage side, wherein the subtraction unit 744 outputs a calculated power $P_{HV}$ via line 753 to output portion 750. The computed reactive power $Q_{Tr}$ is output via line 736 to an adder 742 that receives, as further input by line 719, the measured reactive power $Q_{MV}$ of the medium voltage side, wherein the adder 742 outputs a calculated reactive power $Q_{HV}$ via line 754 to output portion 750. The calculated power $P_{HV}$ and the calculated reactive power $Q_{HV}$ are input to phase angle computation unit 746, which computes the calculated phase angle $PHI_{HV}$ and outputs the corresponding value via line 755 to output portion 750, wherein the following equation is used: $PHI_{HV}=\text{Sign}(Q_{HV})*\text{Arctan}(\text{Abs}(Q_{HV}/P_{HV}))$.

The calculated characteristics, including one, several or all of the calculated voltage, calculated current, calculated power, calculated reactive power, and calculated phase angle, are output from output portion 750 to control line 50. The control signal led by control line 50 is generated by the evaluation unit 700 based on the calculated HV characteristics, and serves to control the power plant for influencing the actual HV characteristics of the HV power line 20. The control signal may, for instance, be provided to a wind farm supervisory control via control line 50.

In the following, a wind turbine and a control system for the wind turbine are described. These can be parts of a wind farm that may include several of such or similar wind turbines and/or control systems. Such wind turbine and/or its control system are examples of wind turbines 100 and control systems 200 as shown in FIGS. 3 and 6.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Figure 1:
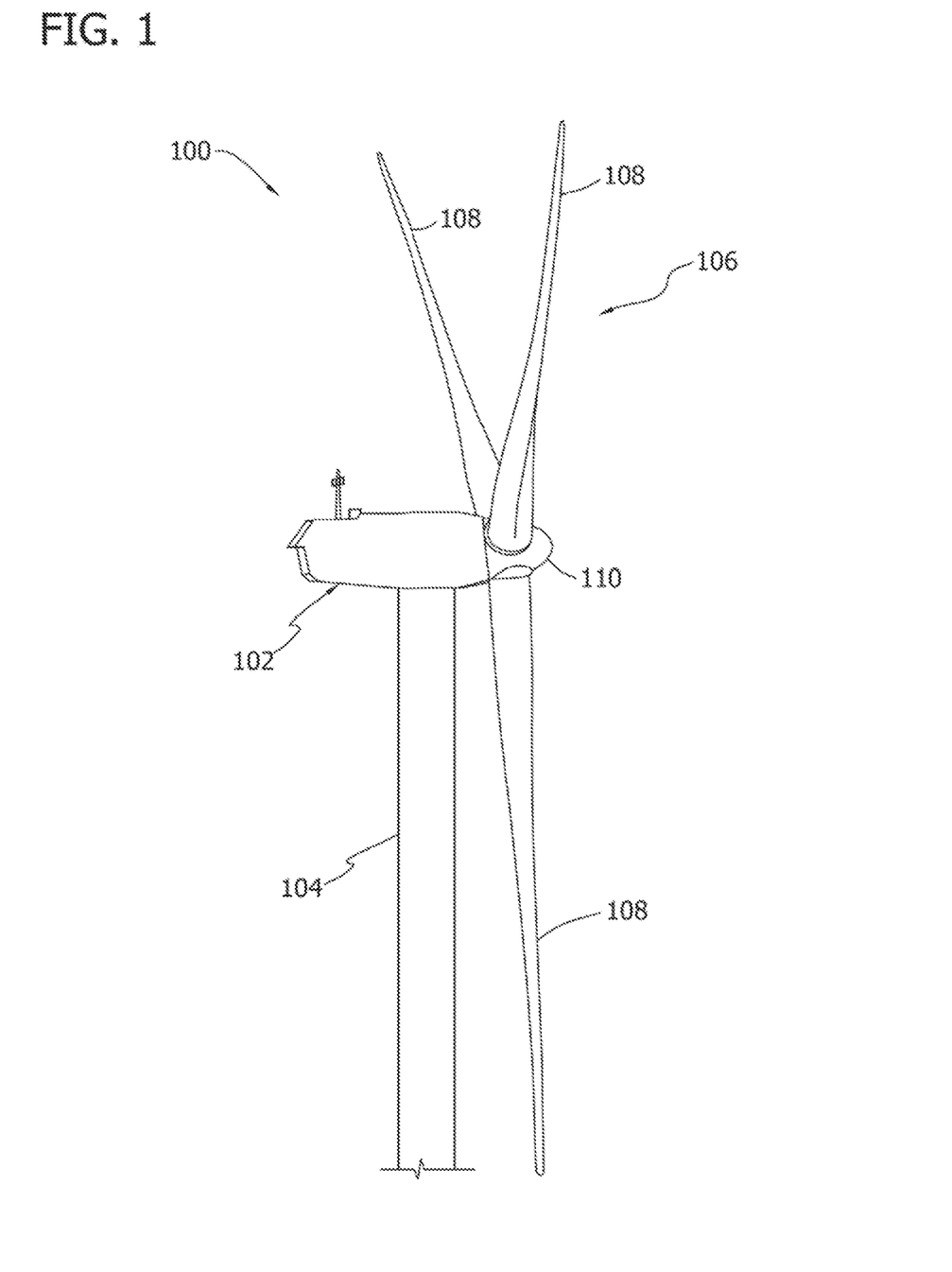
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. The three power lines or leads exiting the drawing area on the left of FIG. 2 can correspond to a three-phase power line as described herein. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. These sensors 252 are not to be confused with the MV-compliant measurement devices and the measurement system according to the embodiments described herein. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 8:
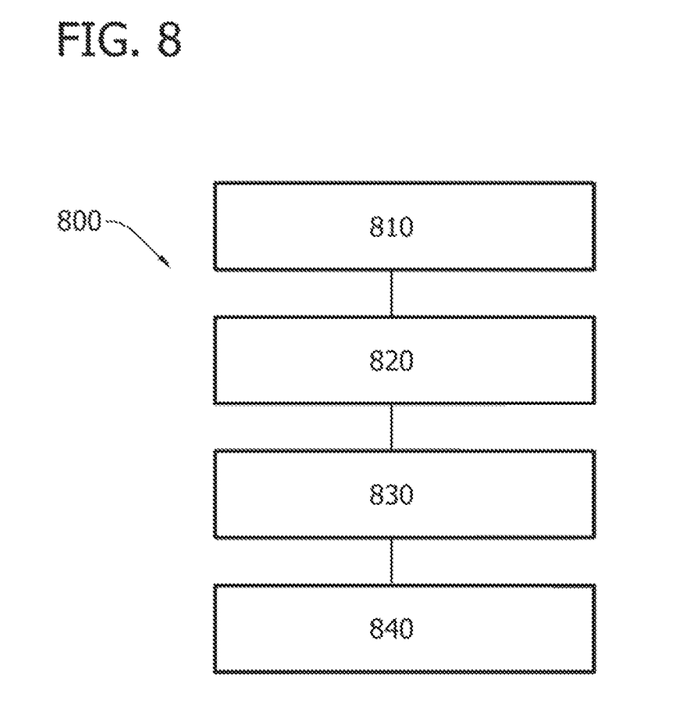
FIG. 8 is schematic illustration of a method for influencing the HV characteristics of an HV power line according to embodiments described herein.

According to further embodiments, as shown in FIG. 8, a method 800 of influencing the actual HV characteristics of an HV power line is provided. The HV power line is connected to an MV power line of a power plant via a transformer for transforming from medium voltage on the MV power line to high voltage on the HV power line. The method includes measuring 810 at least one of voltage and current on the MV power line, determining 820 calculated HV characteristics of the HV power line based on the measured values and based on a model of the transformer, generating 830 a control signal based on the calculated HV characteristics, and controlling 840 the power plant by the control signal for influencing the actual HV characteristics of the HV power line.

The method may include measuring the turns ratio of the transformer. In determining the calculated HV characteristics, the measured turns ratio may be taken into account in the model of the transformer. The method may include measuring the temperature of the transformer. In determining the calculated HV characteristics, the measured temperature may be taken into account in the model of the transformer. The actual HV characteristics may be measured on the HV power line, including at least one of measuring actual voltage and measuring actual current. The method may include comparing the measured actual HV characteristics to the calculated HV characteristics. An alarm signal may be generated if measurement of the actual HV characteristics failed or if at least one the measured actual HV characteristics deviate from the calculated HV characteristics by more than a corresponding threshold value. The method may include switching to control of the power plant by a control signal based on the actual HV characteristics and possibly on the calculated HV characteristics to a control signal solely based on the calculated HV characteristics.

The method may, additionally or alternatively include steps corresponding to any of the functions carried out by the components described with respect to the control system and the power plant. In methods according to embodiments described herein, the same or similar systems as described above may carry out the method steps, but alternatively different systems can be used. Further embodiments relate to the use of a control system or of a power plant as described herein to influence HV characteristics of an HV power line. Therein, the control system or power plant may be used to carry out any of the method steps described herein.

Exemplary embodiments of systems and methods for controlling power plants to influence the characteristics of high voltage power lines at points-of-interconnection to a grid are described above in detail. The systems and methods are not limited to the specific embodiments described herein, but rather, components of the systems and/or steps of the methods may be utilized independently and separately from other components and/or steps described herein. For example, embodiments relating to wind energy power plants are not limited to practice with only the wind turbine systems as described herein. Rather, the exemplary embodiments can be implemented and utilized in connection with many other wind turbine systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a power plant including a medium voltage power line, the control system being configured to influence actual high voltage characteristics of a high voltage power line at a point-of-interconnection to a grid, the control system comprising:
   a medium voltage-compliant measurement system configured for connection with the medium voltage power line of the power plant, the medium voltage-compliant measurement system including at least one of:
      a voltage measurement device configured for measuring a voltage on the medium voltage power line, and
      a current measurement device configured for measuring a current on the medium voltage power line; and
   an evaluation unit connected to the medium voltage-compliant measurement system, the evaluation unit configured to:
      simulate high voltage characteristics of the high voltage power line comprising one or more of a voltage, current, power, reactive power or power factor, the high voltage characteristics being based on measurement values received from the medium voltage-compliant measurement system at the medium voltage power line by applying the measurement values from the medium voltage-compliant measurement system to a model of a transformer stored in a memory which transforms medium voltage on the medium voltage power line to high voltage on the high voltage power line, and
      generate a control signal based on the simulated high voltage characteristics in order to control the power plant for influencing the actual high voltage characteristics of the high voltage power line.

2. The control system according to claim 1, further comprising a turns ratio measurement device for determining a turns ratio of the transformer, wherein the turns ratio measurement device is connected to the evaluation unit, and wherein the determined turns ratio is applied to the model of the transformer for simulating the high voltage characteristics of the high voltage power line.

3. The control system according to claim 2, wherein the transformer includes a tap changer, and the turns ratio measurement device is configured to determine the turns ratio of the transformer by determining a tap position of the tap changer.

4. The control system according to claim 1, further comprising:

a temperature measurement device for determining a temperature of the transformer,
wherein the temperature measurement device is connected to the evaluation unit, and wherein the determined temperature is applied to the model of the transformer for simulating the high voltage characteristics of the high voltage power line.

5. The control system according to claim 1, further comprising:
a high voltage-compliant measurement system configured for connection with the high voltage power line to measure the actual high voltage characteristics of the high voltage power line, the high voltage-compliant measurement system including at least one of:
a second voltage measurement device configured for measuring an actual voltage on the high voltage power line, and
a second current measurement device configured for measuring an actual current on the high voltage power line,
wherein the evaluation unit is connected to the high voltage-compliant measurement system and configured to generate the control signal based additionally on at least one of the measured actual voltage and the measured actual current on the high voltage power line.

6. The control system according to claim 5, wherein the simulated high voltage characteristics include a calculated voltage on the high voltage power line and a calculated current on the high voltage power line, and wherein the evaluation unit is configured to compare the calculated voltage and the calculated current with the measured actual voltage and the measured actual current on the high voltage power line, and to generate an alarm signal if a deviation of at least one of the simulated high voltage characteristics from the measured actual high voltage characteristics is above a threshold value.

7. The control system according to claim 5, wherein, when the measured actual high voltage characteristics are not available or deviate from the simulated high voltage characteristics by more than a threshold value, the evaluation unit is configured to switch from control of the power plant by a control signal based on the measured actual high voltage characteristics of the high voltage power line to control of the power plant by a control signal solely based on the simulated high voltage characteristics of the high voltage power line.

8. The control system according to claim 1, wherein the voltage measurement device includes a medium voltage-compliant voltage transformer and the current measurement device includes a medium voltage-compliant current transformer.

9. The control system according to claim 1, wherein the simulated high voltage characteristics of the high voltage power line include at least one from the group consisting of: voltage, current, power, volt-ampere-reactive, and power factor.

10. A power plant comprising:
a power generating unit;
a medium voltage power line connected to the power generating unit; and
a control system configured to control the power generating unit and to influence actual high voltage characteristics of a high voltage power line at a point-of-interconnection to a grid, wherein the control system comprises a medium voltage-compliant measurement system connected to the medium voltage power line of the power plant, the medium voltage-compliant measurement system including at least one of:
a voltage measurement device configured for measuring a voltage on the medium voltage power line, and
a current measurement device configured for measuring a current on the medium voltage power line; and
an evaluation unit connected to the medium voltage-compliant measurement system and configured to:
simulate high voltage characteristics of the high voltage power line, comprising one or more of a voltage, current, power, reactive power or power factor, the high voltage characteristics being based on measurement values received from the medium voltage-compliant measurement system at the medium voltage power line and based on a model of a transformer stored in a memory which transforms medium voltage on the medium voltage power line to high voltage on the high voltage power line, and
generate a control signal based on the simulated high voltage characteristics in order to control the power plant for influencing the actual high voltage characteristics of the high voltage power line.

11. The power plant according to claim 10, wherein the power plant includes the transformer and the high voltage power line and is configured for connection to the grid at the point-of-interconnection.

12. The power plant according to claim 10, wherein the power plant is configured for connection, via its medium voltage power line, to a medium voltage grid, that connects to the transformer and the high voltage power line.

13. The power plant according to claim 10, wherein the power plant is renewable-power plant and the power generating unit includes a least one turbine and at least one corresponding turbine control system, wherein the evaluation unit is configured to generate the control signal to control the at least one turbine control system.

14. The power plant according to claim 10, wherein the power plant is a wind energy power plant and the power generating unit includes at least one wind turbine and at least one corresponding wind turbine control system, wherein the evaluation unit is configured to generate the control signal to control the at least one wind turbine control system.

15. A method of influencing actual high voltage characteristics of a high voltage power line connected to a medium voltage power line of a power plant via a transformer for transforming from medium voltage on the medium voltage power line to high voltage on the high voltage power line, the method comprising:
measuring at least one of voltage and current on the medium voltage power line;
simulating high voltage characteristics of the high voltage power line comprising one or more of a voltage, current, power, reactive power or power factor, the high voltage characteristics being based on the measured values and based on a model of the transformer stored in a memory;
generating a control signal based on the simulated high voltage characteristics; and
controlling the power plant by the control signal for influencing the actual high voltage characteristics of the high voltage power line.

16. The method according to claim 15, further comprising:
measuring a turns ratio of the transformer; and,
simulating the high voltage characteristics using the model of the transformer, the measured turns ratio being applied to the model of the transformer.

17. The method according to claim 15, further comprising:
measuring a temperature of the transformer; and,
simulating the high voltage characteristics using the model of the transformer, the temperature of the transformer being applied to the model of the transformer.

18. The method according to claim 15, further comprising:
measuring the actual high voltage characteristics, including at least one of an actual voltage and an actual current, on the high voltage power line; and,
comparing the measured actual high voltage characteristics to the simulated high voltage characteristics.

19. The method according, to claim 18, further comprising:
generating an alarm signal if measuring the actual high voltage characteristics failed or if the measured actual high voltage characteristics deviate from the simulated high voltage characteristics by more than a threshold value.

20. The method according, to claim 19, further comprising:
switching to control of the power plant by a control signal based on the actual high voltage characteristics to a control signal solely based on the simulated high voltage characteristics.

\* \* \* \* \*